(12) United States Patent
Bala et al.

(10) Patent No.: US 6,470,492 B2
(45) Date of Patent: *Oct. 22, 2002

(54) LOW OVERHEAD SPECULATIVE SELECTION OF HOT TRACES IN A CACHING DYNAMIC TRANSLATOR

(75) Inventors: Vasanth Bala, Sudbury, MA (US); Evelyn Duesterwald, Boston, MA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,296

(22) Filed: May 14, 1999

(65) Prior Publication Data

US 2002/0104075 A1 Aug. 1, 2002

(51) Int. Cl.[7] .................................................. G06F 9/44
(52) U.S. Cl. ...................................................... 717/128
(58) Field of Search .......................... 717/4, 5, 9, 128, 717/127–135; 714/45, 702, 202; 711/133, 202, 13

(56) References Cited

U.S. PATENT DOCUMENTS

| | | | | | |
|---|---|---|---|---|---|
| 3,707,725 | A | * | 12/1972 | Dellheim | 717/4 |
| 5,751,982 | A | | 5/1998 | Morley | 395/800 |
| 6,148,437 | A | * | 11/2000 | Shah et al. | 717/4 |
| 6,189,141 | B1 | * | 2/2001 | Benitez et al. | 717/4 |
| 6,205,545 | B1 | * | 3/2001 | Shah et al. | 712/237 |
| 6,219,827 | B1 | * | 4/2001 | Man | 717/4 |
| 6,237,065 | B1 | * | 5/2001 | Banerjia et al. | 711/133 |

OTHER PUBLICATIONS

Ball et al. Optimally Profiling and Tracing Programs. ACM. Aug. 1992. pp. 59–70.*
Mink. MultiKron: Performance Measurement Instrumentation. IEEE. 1996. p. 55.*
Bob Cmelik, et al.; "Shade: A Fast Instruction–Set Simulator For Execution Profiling"; Sigmetrics 94–5/94; pp. 128–137.
Thomas Ball, et al.; "Branch Prediction for Free"; ACM–SIGPLAN–PLDI–6/93; pp. 300–313.
Thomas Ball, et al.; "Efficient Path Profiling"; 1072–4451/96 IEEE; pp. 46–47.
"The Java Hotspot Performance Engine Architecture," A White Paper About Sun's Second Generation Performance Technology, Apr. 1999, [retrieved from the Internet on Jun. 09, 1999], [http://java.sun,.com/products/hotspot/whitepaper.html], Sun Microsystems, Inc.

(List continued on next page.)

*Primary Examiner*—Gregory Morse
*Assistant Examiner*—Wei Zhen
(74) *Attorney, Agent, or Firm*—Scott K. Peterson

(57) ABSTRACT

A method and apparatus for selecting hot traces for translation and/or optimization is described in the context of a caching dynamic translator. The code cache stores hot traces. Profiling is done at locations that satisfy a start-of-trace condition, e.g., the targets of backward taken branches. A hot target of a backward taken branch is speculatively identified as the beginning of a hot trace, without the need to profile the blocks that make up the trace. The extent of the speculatively selected hot trace is determined by an end-of-trace condition, such as a backward taken branch or a number of interpreted or native instructions. The interpreter is augmented with a mode in which it emits native instructions that are cached. A trace is cached by identifying a hot start of a trace and then continuing interpretation while storing the emitted native instruction stream until an end-of-trace condition is met.

13 Claims, 3 Drawing Sheets

OTHER PUBLICATIONS

Witchel, Emmett. et al., "Embra: Fast and Flexible Machine Simulation," Sigmetrics 1996.

Cmelik, Robert F., et al., "Shade: A Fast Instruction–Set Simulator for Execution Profiling," Technical Report UWCSE Jun. 06, 1993, University of Washington and Sun Microsystems, Inc., 1993.

Cmelik, Robert, F., et al., "Shade: A Fast Instruction–Set Stimulator For Execution Profiling," ACM Sigmetrics Conference on Measurement and Modeling of Computer Systems, Association for Computing Machinery (ACM, Inc.), 1994.

* cited by examiner

LOW OVERHEAD SPECULATIVE SELECTION OF HOT TRACES IN A CACHING DYNAMIC TRANSLATOR

FIELD OF THE INVENTION

The present invention relates to techniques for identifying portions of computer programs that are particularly frequently executed. The present invention is particularly useful in dynamic translators needing to identify candidate portions of code for caching and/or optimization.

BACKGROUND

Dynamic translators translate one sequence of instructions into another sequence of instructions which is executed. The second sequence of instructions are 'native' instructions—they can be executed directly by the machine on which the translator is running (this 'machine' may be hardware or this machine may be defined by software that is running on yet another machine with its own architecture). A dynamic translator can be designed to execute instructions for one machine architecture (i.e., one instruction set) on a machine of a different architecture (i.e., with a different instruction set). Alternatively, a dynamic translator can take instructions that are native to the machine on which the dynamic translator is running and operate on that instruction stream to produce an optimized instruction stream. Also, a dynamic translator can include both of these functions (translation from one architecture to another, and optimization).

Caching dynamic translators attempt to identify program hot spots (frequently executed portions of the program, such as certain loops) at runtime and use a code cache to store translations of those frequently executed portions. Subsequent execution of those portions can use the cached translations, thereby reducing the overhead of executing those portions of the program.

A dynamic translator may take instructions in one instruction set and produce instructions in a different instruction set. Or, a dynamic translator may perform optimization: producing instructions in the same instruction set as the original instruction stream; thus, dynamic optimization is a special native-to-native case of dynamic translation. Or, a dynamic translator may do both—converting between instruction sets as well as performing optimization.

In general, the more sophisticated the execution profiling scheme, the more precise the hot spot identification can be, and hence (i) the smaller the translated code cache space required to hold the more compact set of identified hot spots of the working set of the running program, and (ii) the less time spent translating hot spots into native code (or into optimized native code). Unless special hardware support for profiling is provided, it is generally the case that a more complex profiling scheme will incur a greater overhead. Thus, dynamic translators typically have to strike a balance between minimizing overhead on the one hand and selecting hot spots very carefully on the other.

Depending on the profiling technique used, the granularity of the selected hot spots can vary. For example, a fine-grained technique may identify single blocks (a straight-line sequence of code without any intervening branches), whereas a more coarse approach to profiling may identify entire procedures. Since there are typically many more blocks that are executed compared to procedures, the latter requires much less profiling overhead (both memory space for the execution frequency counters and the time spent updating those counters) than the former. In systems that are doing program optimization, another factor to consider is the likelihood of useful optimization and/or the degree of optimization opportunity that is available in the selected hot spot. A block presents a much smaller optimization scope than a procedure (and thus fewer types of optimization techniques can be applied), although a block is easier to optimize because it lacks any control flow (branches and joins).

Traces offer yet a different set of tradeoffs. Traces (also known as paths) are single-entry multi-exit dynamic sequences of blocks. Although traces often have an optimization scope between that for blocks and that for procedures, traces may pass through several procedure bodies, and may even contain entire procedure bodies. Traces offer a fairly large optimization scope while still having simple control flow, which makes optimizing them much easier than a procedure. Simple control flow also allows a fast optimizer implementation. A dynamic trace can even go past several procedure calls and returns, including dynamically linked libraries (DLLs). This allows an optimizer to perform inlining, which is an optimization that removes redundant call and return branches, which can improve performance substantially.

Unfortunately, without hardware support, the overhead required to profile hot traces using existing methods (such as described by T. Ball and J. Larus in "Efficient Path Profiling", Proceedings of the 29th Symposium on Micro Architecture (MICRO-29), December 1996) is often prohibitively high. Such methods require instrumenting the program binary (inserting instructions to support profiling), which makes the profiling non-transparent and can result in binary code bloat. Also, execution of the inserted instrumentation instructions slows down overall program execution and once the instrumentation has been inserted, it is difficult to remove at runtime. In addition, such method requires sufficiently complex analysis of the counter values to uncover the hot paths in the program that such method is difficult to use effectively on-the-fly while the program is executing. All of these make traditional schemes inefficient for use in a caching dynamic translator.

Hot traces can also be constructed indirectly, using branch or basic block profiling (as contrasted with trace profiling, where the profile directly provides trace information). In this scheme, a counter is associated with the taken target of every branch (there are other variations on this, but the overheads are similar). When the caching dynamic translator is interpreting the program code, it increments such a counter each time a taken branch is interpreted. When a counter exceeds a preset threshold, its corresponding block is flagged as hot. These hot blocks can be strung together to create a hot trace. Such a profiling technique has the following shortcomings:

1. A large counter table is required, since the number of distinct blocks executed by a program can be very large.
2. The overhead for trace selection is high. The reason can be intuitively explained: if a trace consists of N blocks, this scheme will have to wait until N counters all exceed their thresholds before they can be strung into a trace. It does not take advantage of the fact that after the first counter gets hot, the next N-1 counters are very likely to get hot in quick succession, making it unnecessary to bother incrementing them and doing the bookkeeping of the past blocks that have just executed.

SUMMARY OF THE INVENTION

According to the present invention, traces are identified as hot on a speculative basis, rather than based on full trace profile data. The series of blocks beginning at a hot start-of-trace condition and continuing until an end-of-trace condition is identified as a hot trace. Such a trace is identified as hot without the need to incur the overhead of actually measuring whether successive blocks have been executed a sufficient number of times to be considered hot.

The identification of what constitutes the trace is accomplished as the trace is executed. A translation of the trace is emitted as the trace is being executed, is available for optimization in a system that performs optimization, and is captured in the code cache.

A particularly useful start-of-trace condition is when the last interpreted branch was backward taken. A useful end-of-trace condition is when one of the following three conditions occurs: (1) the last interpreted branch was backward taken, (2) the number of interpreted branches exceeded a threshold value, or (3) the number of native instructions emitted for the trace exceeded another threshold value.

Thus, according to the present invention, rather than use higher overhead, sophisticated profiling techniques for identifying program hot spots at runtime, profiling need only be done at certain well-defined program addresses, such as the targets of backward taken branches. When such an address gets hot (i.e., its associated counter exceeds a threshold), the very next sequence of executed blocks (or trace) is speculatively chosen as a hot path.

This scheme speculatively selects as a hot trace the very next sequence of interpreted blocks following certain hot branch targets—in particular, certain branch targets that are likely to be loop headers. Even though this scheme does not involve elaborate profiling, the quality of the traces selected by this technique can be excellent. One can understand why this scheme is effective as follows: sequences of hot blocks are very often correlated; entire paths tend to get hot in a running program, rather than a disconnected set of blocks.

The present invention provides a mechanism for trace selection with reduced profiling overhead.

Another advantage of the present invention is that a trace can be constructed even when it contains indirect branches (branches whose outcomes are known only when the branch is executed, and which cannot be determined by simply decoding the branch instruction). In contrast, it is awkward for trace growing schemes that rely on branch prediction information to deal with indirect branches, because there is no simple way to predict the outcome of such branches.

A further advantage of the invention is that the memory required for the storage of counters is smaller compared to traditional profiling schemes based on branch or basic block counting, because, with the present invention, it is not necessary to keeping track of counts for each block or for each branch.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION OF AN ILLUSTRATIVE EMBODIMENT

Figure 1:
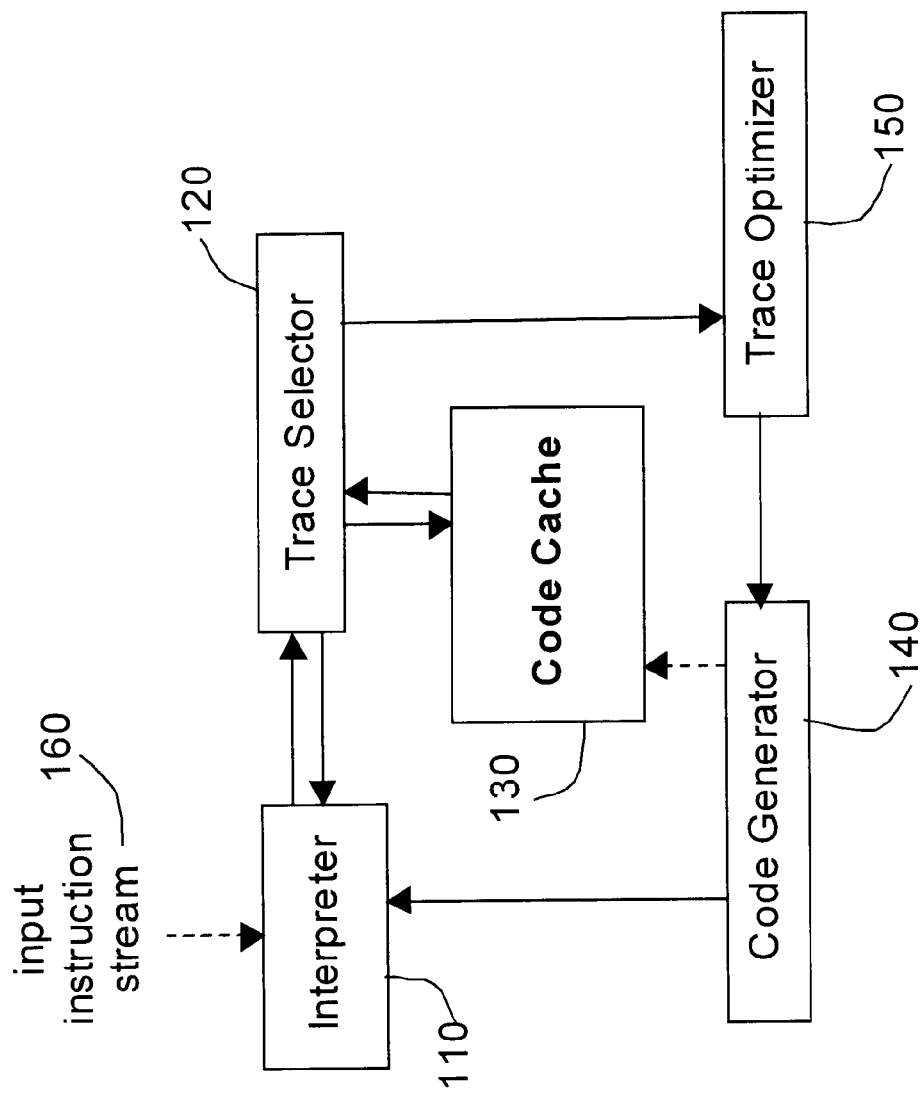
FIG. 1 illustrates the components of a dynamic translator such as one in which the present invention can be employed.

Referring to FIG. 1, a dynamic translator includes an interpreter 110 that receives an input instruction stream 160. This "interpreter" represents the instruction evaluation engine; it can be implemented in a number of ways (e.g., as a software fetch—decode—eval loop, a just-in-time compiler, or even a hardware CPU).

In one implementation, the instructions of the input instruction stream 160 are in the same instruction set as that of the machine on which the translator is running (native-to-native translation). In the native-to-native case, the primary advantage obtained by the translator flows from the dynamic optimization 150 that the translator can perform. In another implementation, the input instructions are in a different instruction set than the native instructions.

The trace selector 120 identifies instruction traces to be stored in the code cache 130. The trace selector is the component responsible for associating counters with interpreted program addresses, determining when to toggle the interpreter state (between normal and trace growing mode), and determining when a "hot trace" has been detected.

Much of the work of the dynamic translator occurs in an interpreter—trace selector loop. After the interpreter 110 interprets a block of instructions (i.e., until a branch), control is passed to the trace selector 120 to make the observations of the program's behavior so that it can select traces for special processing and placement in the cache. The interpreter—trace selector loop is executed until one of the following conditions is met: (a) a cache hit occurs, in which case control jumps into the code cache, or (b) a hot start-of-trace is reached.

When a hot start-of-trace is found, the trace selector 120 toggles the state of the interpreter 110 so that the interpreter emits the trace instructions until the corresponding end-of-trace condition (condition (b)) is met. At this point the trace selector invokes the trace optimizer 150. The trace optimizer is responsible for optimizing the trace instructions for better performance on the underlying processor. After optimization is done, the code generator 140 actually emits the trace code into the code cache 130 and returns to the trace selector 120 to resume the interpreter—trace selector loop.

Figure 2:
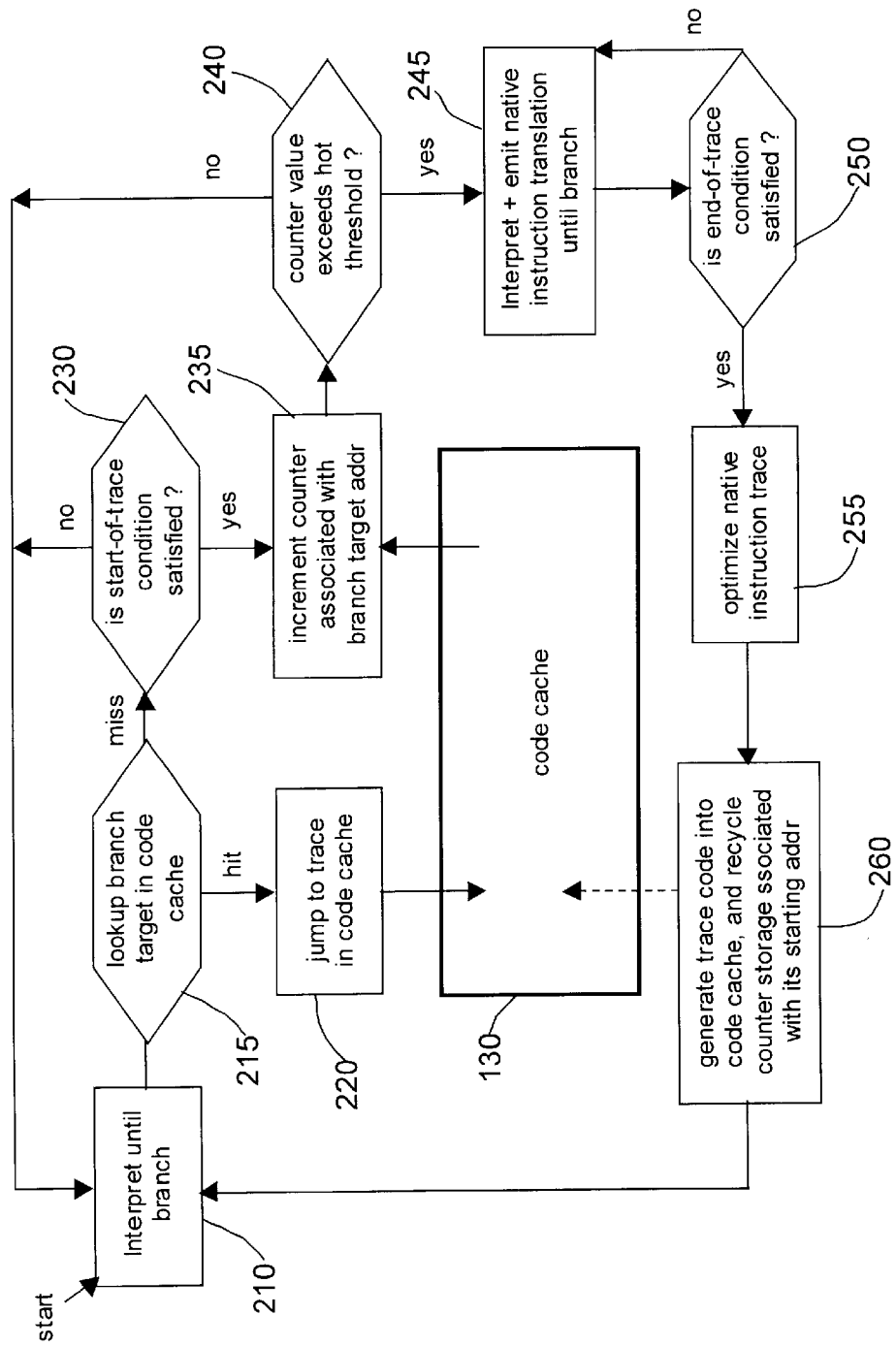
FIG. 2 illustrates the flow of operations in an implementation of a dynamic translator employing the present invention.

FIG. 2 illustrates operation of an implementation of a dynamic translator employing the present invention. The solid arrows represent flow of control, while the dashed arrow represents generation of data. In this case, the generated "data" is actually executable sequences of instructions (traces) that are being stored in the translated code cache 130.

The functioning of the interpreter 110, 210, 245 in the dynamic translator of the illustrative embodiment has been extended so that it has a new operating state (referred to below as "grow trace mode"): when in that new state, the native code for a trace is emitted as a side effect of interpretation. For a native-to-native translation, this process of emitting instructions simply amounts to passing on the relevant instructions from the input instruction stream 160. For other translations, the input instructions are translated into native instructions, and those native instructions are recorded in a buffer. The translated native instructions are then executed and then emitted—the buffer of translated instructions is made available for further processing (i.e., optimization 255 and placement into the cache 260). Although a block is a useful unit to translate, execute, and emit, the interpreter may emit translated instructions in other units, and the interpreter may perform the translate— execute loop on one size (such as instruction or block) and pass translated instructions on for further processing in different units (such as a block or trace). Also, various alternative implementations of an interpreter that emits translated instructions are possible.

The native code emitted by the interpreter 245 is stored in the translated code cache 130 for execution without the need for interpretation the next time that portion of the program is executed (unless intervening factors have resulted in that code having been flushed from the cache). In FIG. 2, the "normal mode" operation of the interpreter 110 is shown at 210 and the "grow trace mode" operation of the interpreter is shown at 245.

The grow trace mode 245 of the interpreter 110 is exploited in the present invention as a mechanism for identifying the extent of a trace; not only does grow trace mode generate data (instructions) to be stored in the cache, it plays a role in trace selection process itself. As described above, the present invention initiates trace selection based on limited profiling: certain addresses that meet start-of-trace conditions are monitored, without the need to maintain profile data for entire traces. A trace is selected based on a hot start-of-trace condition. This selection is speculative, because the actual trace being selected (which will be determined as the interpreter works its way through the trace in grow trace mode) may not be a frequently executed trace, even though it starts at a frequently executed starting address. At the time a trace is identified as being hot (based on the execution counter exceeding a threshold), the extent of the instructions that make up the trace is not known. The process of the interpreter emitting instructions is what maps the extent of the trace; the trace grow mode is used to unravel the trace on the fly.

Figure 3:
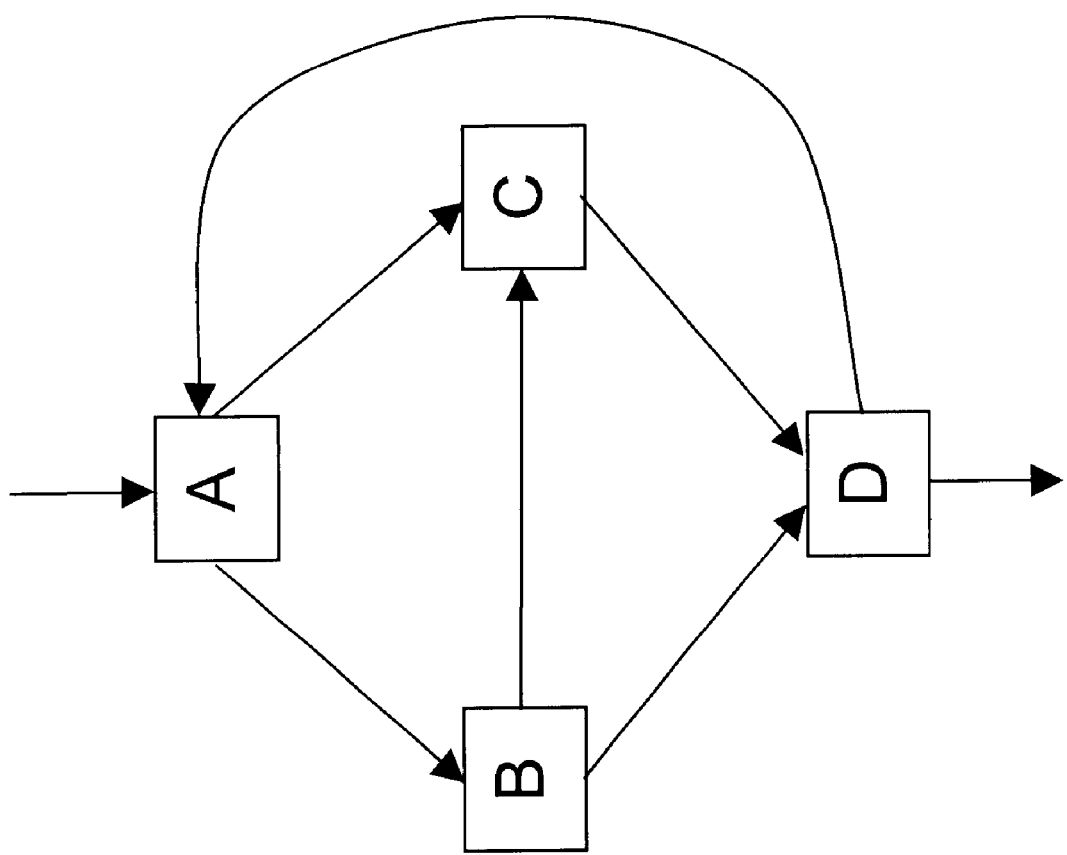
FIG. 3 shows program flow through four blocks of a program, illustrating that there can be a number: of different traces starting with a common block.

For example, referring to FIG. 3, four blocks of a program are shown to illustrate how identification of a trace starting point does not itself fully identify a trace. Block A meets the start-of-trace condition (it is the target of a backward branch from D). With four blocks having the branching relationship shown in FIG. 3, the following traces all share the same starting point (A): ABCD, ABD, ACD. The trace that the program follows at the time that the counter for A becomes hot is the trace that is selected for storage in the cache in response to that counter becoming hot—it could be any of those three traces (actually, there may be more than three possible traces, if the traces continue beyond D).

Referring to FIG. 2, the dynamic translator starts by interpreting instructions until a taken branch is interpreted 210. At that point, a check is made to see if a trace that starts at the taken branch target exists in the code cache 215. If there is such a trace (i.e., a cache 'hit'), control is transferred 220 to the top of that version of the trace that is stored in the cache 130.

When, after executing instructions stored in the cache 130, control exits the cache via an exit branch, a counter associated with the exit branch target is incremented 235 as part of the "trampoline" instruction sequence that is executed in order to hand control back to the dynamic translator. When the trace is formed for storage in the cache 130, a set of trampoline instructions is included in the trace for each exit branch in the trace. These instructions (also known as translation "epilogue") transfer control from the instructions in the cache back to the interpreter—trace selector loop. An exit branch counter is associated with the trampoline corresponding to each exit branch. Like the storage for the trampoline instructions for a cached trace, the storage for the trace exit counters is also allocated automatically when the native code for the trace is emitted into the translated code cache. In the illustrative embodiment, as a matter of convenience, the exit counters are stored with the trampoline instructions; however, the counter could be stored elsewhere, such as in an array of counters.

Referring again to 215 in FIG. 2, if, when the cache is checked for a trace starting at the target of the taken branch, no such trace exists in the cache, then a determination is made as to whether a "start-of-trace" condition exists 230. In the illustrative embodiment, the start-of-trace condition is when the just interpreted branch was a backward taken branch. Alternatively, a system could employ different start-of-trace conditions that combined with or did not include backward taken branches: procedure call instructions, exits from the code cache, system call instructions, or machine instruction cache misses (if the hardware provided some means for tracking such things).

A backward taken branch is a useful start-of-trace condition because it exploits the observation that the target of a backward taken branch is very likely to be (though not necessarily) the start of a loop. Since most programs spend a significant amount of time in loops, loop headers are good candidates as possible hot spot entrances. Also, since there are usually far fewer loop headers in a program than taken branch targets, the number of counters and the time taken in updating the counters is reduced significantly when one focuses on the targets of backward taken branches (which are likely to be: loop headers), rather than on all branch targets.

If the start-of-trace condition is not met, then control re-enters the basic interpreter state and interpretation continues. In this case, there is no need to maintain a counter; a counter increment takes place only if a start-of-trace condition is met. This is in contrast to conventional dynamic translator implementations that have maintained counters for each branch target. In the illustrative embodiment counters are only associated with the address of the backward taken branch targets and with targets of branches that exit the translated code cache; thus, the present invention permits a system to use less counter storage and to incur less counter increment overhead.

If the determination of whether a "start-of-trace" condition exists 230 is that the start-of-trace condition is met, then, if a counter for the target does not exist, one is created or if a counter for the target does exist, that counter is incremented.

If the counter value for the branch target does not exceed the hot threshold 240, then control re-enters the basic interpreter state and interpretation continues 210.

If the counter value does exceed a hot threshold 240, then this branch target is the beginning of what will be deemed to be a hot trace. At this point, that counter value is not longer needed, and that counter can be recycled (alternatively, the counter storage could be reclaimed for use for other purposes). This is an advantage over profiling schemes that involve instrumenting the binary.

Because the profile data that is being collected by the start-of-trace counters is consumed on the fly (as the program is being executed), these counters can be recycled when its information is no longer needed; in particular, once a start-of-trace counter has become hot and has been used to select a trace for storage in the cache, that counter can be recycled. The illustrative embodiment includes a fixed size table of start-of-trace counters. The table is associative—each counter can be accessed by means of the start-of-trace address for which the counter is counting. When a counter for a particular start-of-trace is to be recycled, that entry in the table is added to a free list, or otherwise marked as free.

The lower the threshold, the less time is spent in the interpreter, and the greater the number of start-of-traces that potentially get hot. This results in a greater number of traces being generated into the code cache (and the more speculative the choice of hot traces), which in turn can increase the pressure on the code cache resources, and hence the overhead of managing the code cache. On the other hand, the higher the threshold, the greater the interpretive overhead (e.g., allocating and incrementing counters associated with start-of-traces). Thus the choice of threshold has to balance these two forces. It also depends on the actual interpretive and code cache management overheads in the particular implementation. In our specific implementation, where the interpreter was written as a software fetch-decode-eval loop in C, a threshold of 50 was chosen as the best compromise.

If the counter value does exceed a hot threshold 240, then, as indicated above, the address corresponding to that counter will be deemed to be the start of a hot trace. At the time the trace is identified as hot, the extent of the trace remains to be determined (by the end-of-trace condition described below). Also, note that the selection of the trace as 'hot' is speculative, in that only the initial block of the trace has actually been measured to be hot.

At this point, the interpreter transitions from normal mode 210 to grow trace mode 245. In this mode, as described above, interpretation continues, except that as instructions are interpreted, the native translation of the instructions is also emitted so that they can be stored in the code cache 130. The interpreter stores the native instructions into a buffer. When an end-of-trace condition is reached 250, the buffer with the complete trace is handed to an optimizer 255. After optimization, the optimized native instructions are placed into the cache, and the counter storage associated with the trace's starting address is recycled 260. (Alternatively, the counter storage could be recycled as early as when the counter has been determined to exceed the hot threshold.) Also, triggered by the end-of-trace condition, the interpreter 110 transitions back to the normal interpreter state.

An end-of-trace condition is simply a heuristic that says when to stop growing the current trace. The following are some examples of some possible end-of-trace conditions: ending a trace when a backward taken branch is reached avoids unfolding cycles unnecessarily and also captures loops; a "return" branch can be a useful end-of-trace because it can indicate the end of a procedure body; generally, it is desireable to trigger and end-of-trace if a new start-of-trace has occurred.

In the illustrative embodiment, the end-of-trace condition is met when (a) a backward taken branch is interpreted, or (b) when a certain number of branch instructions has been interpreted (in the illustrative embodiment this number is 20) since entering the grow trace mode (capping the number of branches on the trace limits the number of places that control can exit the trace—the greater the number of branches that can exit the trace, the less the likelihood that the entire trace is going to be utilized and the greater the likelihood of an early trace exit), or (c) a certain number of native translated instructions has been emitted into the code cache for the current trace. The limit on the number of instructions in a trace is chose to avoid excessively long traces. In the illustrative embodiment, this is 1024 instructions, which allows a conditional branch on the trace to reach its extremities (this follows from the number of displacement bits in the conditional branch instruction on the PA-RISC processor, on which the illustrative embodiment is implemented).

Although the cache can be sized large enough so that replacement of entries is not required, typically a replacement scheme will be used. One approach is to flush the cache when it is full and space for a new entry is needed. However, another approach that offers advantages is to flush the cache preemptively, based on some indication that the program's working set is changing. Such a preemptive approach is described in the co-owned application titled "A Preemptive Replacement Strategy For A Caching Dynamic Translator," Sanjeev Banerjia, Vasanth Bala, and Evelyn Duesterwald, filed the same date as the present application.

When a trace is removed from the code cache, the memory used for counter storage for each of the trace's exit branches is automatically recovered. Thus, the storage for these exit branch target counters is "free" in that sense, because they do not have to be independently allocated and managed like the other counters associated with interpreted branch targets (those targets that have met start-of-trace conditions, but for which the associated counter has not yet exceeded the "hot" threshold); as discussed above, the exit branch target counters are allocated as a part of creating the trampoline for the exit branch.

In the illustrative embodiment, FIGS. 1 and 2 are related as follows; one skilled in the art will appreciate that these functions can be organized in other ways in other implementations. The interpreter 210 implements 210 and 245. The code generator 140 implements 260. The trace optimizer 150 implements 255. The trace selector 120 implements 215, 220, 230, 235, 240, and 250.

The illustrative embodiment of the present invention is implemented as software running on a general purpose computer, and the present invention is particularly suited to software implementation. Special purpose hardware can also be useful in connection with the invention (for example, a hardware 'interpreter', hardware that facilitates collection of profiling data, or cache hardware).

The foregoing has described a specific embodiment of the invention. Additional variations will be apparent to those skilled in the art. For example, although the invention has been described in the context of a dynamic translator, it can also be used in other systems that employ interpreters or just-in-time compilers (JITs). Further, the invention could be employed in other systems that emulate any non-native system, such as a simulator. Thus, the invention is not limited to the specific details and illustrative example shown and described in this specification. Rather, it is the object of the appended claims to cover all such variations and modifications as come within the true spirit and scope of the invention.

We claim:

1. In a dynamic translator, a method for selecting hot traces in a program being translated comprising the steps of:
   (A) dynamically associating counters with addresses in the program being translated that are determined, during program translation and execution, to meet a start-of-trace condition;
   (B) when an instruction with a corresponding counter is executed, incrementing that counter, and
   (C) when a counter exceeds a threshold, determining the particular trace (of the possible plurality of traces beginning at that address) that begins at the address corresponding to that counter and is defined by the path of execution taken by the program following that particular execution of that instruction and continuing until an end-of-trace condition is met and identifying that trace as a hot trace.

2. The method of claim 1 in which the dynamic translator includes an interpreter that can be switched between a normal mode and a grow trace mode in which the interpreter emits native instructions as a side-effect of interpretation, the method further comprising the steps of:

(D) when a counter exceeds a threshold, switching the interpreter to grow trace mode;

(E) when the interpreter is in grow trace mode and an end-of-trace condition is met, switching the interpreter to normal mode;

(F) using the instructions emitted by the interpreter to determine the trace that is to be identified as a hot trace.

3. The method of claim 1 in which, in response to identifying a trace as a hot trace, the corresponding counter is recycled.

4. The method of claim 1 in which the start-of-trace condition is when the last interpreted branch was backward taken.

5. The method of claim 2 in which the start-of-trace condition is when the last interpreted branch was backward taken.

6. In a dynamic translator comprising:

(A) counters for storing counts of the number of times that instructions are executed at addresses associated with the counters;

(B) means for identifying addresses that meet a start-of-trace condition and for associating such addresses with counters;

(C) means for determining when a counter exceeds a threshold; and (D) trace identification means for identifying a series of instructions executed following the instruction at the address associated with the counter as a hot trace.

7. The dynamic translator of claim 6 further comprising an interpreter that can be switched between a normal mode and a grow trace mode in which the interpreter emits native instructions as a side-effect of interpretation, and in which the interpreter is switched to the grow trace mode in response to a counter exceeding a threshold, and in which the trace identification means uses the emitted instructions in its identification of a hot trace.

8. The translator of claim 6 in which, in response to identifying a trace as a hot trace, the corresponding counter is recycled.

9. The translator of claim 6 in which the start-of-trace condition is when the last interpreted branch was backward taken.

10. The translator of claim 7 in which the start-of-trace condition is when the last interpreted branch was backward taken.

11. In a dynamic translator, a method for selecting hot traces comprising the steps of:

(A) maintaining counts for addresses that meet a start-of-trace condition;

(B) detecting when one of these counters exceeds a threshold;

(C) in response to a counter exceeding a threshold, identifying as a hot trace the instructions beginning with the address with which that counter was associated and continuing until reaching an end-of-trace condition.

12. In a dynamic translator having a cache, a method for selecting hot traces comprising the steps of:

(A) when a backward branch is taken, if a counter does not exist for the branch target, then creating such a counter, if such a counter does exist, then incrementing the counter;

(B) if a counter exceeds a threshold, then storing in the cache a translation of those instructions executed starting at the branch target associated with the counter that exceeded the threshold and continuing until an end-of-trace condition is reached.

13. The translator of claim 12 in which, when a translation is stored in the cache, the corresponding counter is recycled.

* * * * *